(12) United States Patent
Moore et al.

(10) Patent No.: US 8,770,593 B2
(45) Date of Patent: Jul. 8, 2014

(54) VEHICLE SUSPENSION SYSTEMS

(71) Applicant: GM Global Technology Operations LLC, Detroit, MI (US)

(72) Inventors: Joseph K Moore, Whitby (CA); Liviu Serbu, Woodbridge (CA); Anthony L. Lyscio, Ajax (CA); Terry W. Ostan, Whitby (CA)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 13/835,484

(22) Filed: Mar. 15, 2013

(65) Prior Publication Data

US 2014/0131961 A1    May 15, 2014

Related U.S. Application Data

(60) Provisional application No. 61/726,309, filed on Nov. 14, 2012.

(51) Int. Cl.
*B60G 17/00* (2006.01)

(52) U.S. Cl.
USPC .................................... 280/5.515; 280/6.157

(58) Field of Classification Search
USPC ................. 280/5.514, 5.515, 6.157, 124.145, 280/124.154, 124.158
See application file for complete search history.

(56) References Cited

U.S. PATENT DOCUMENTS

2010/0308518 A1* 12/2010 Michel .......................... 267/218
2012/0181757 A1*  7/2012 Oteman et al. ............. 280/5.515

* cited by examiner

*Primary Examiner* — Faye M. Fleming
(74) *Attorney, Agent, or Firm* — Quinn Law Group, PLLC (57) ABSTRACT

A suspension system for a vehicle includes a damper having a central longitudinal axis, and a jack assembly attached to the damper. The jack assembly includes a seat abutting and rotatable about the damper, a resilient member coiled about the damper and coupled to the seat so that the resilient member is not rotatable with respect to the seat, a ball screw abutting and fixedly attached to the damper, wherein the ball screw is not rotatable about the damper, a ball nut abutting and rotatable about the ball screw and the damper, a first clutch coiled about the ball nut and coupled to the seat, and a second clutch coiled about the damper and coupled to the ball nut. The seat is translatable along the damper to thereby raise and lower the body of the vehicle. A vehicle including the suspension system is also disclosed.

20 Claims, 6 Drawing Sheets

VEHICLE SUSPENSION SYSTEMS

CROSS REFERENCE TO RELATED APPLICATIONS

This application incorporates by reference in its entirety U.S. Provisional Patent Application No. 61/726,309, filed on Nov. 14, 2012.

TECHNICAL FIELD

The disclosure relates to a suspension system for a vehicle.

BACKGROUND

Suspension systems for vehicles generally interconnect a body of the vehicle and one or more wheels of the vehicle, and optimize vehicle steering, vehicle braking, and occupant comfort. For example, suspension systems may include a damper which isolates the body of the vehicle from jolts and bumps as the vehicle travels across a rough or uneven surface.

SUMMARY

A suspension system for a vehicle includes a damper interconnecting a body and a wheel of the vehicle and having a central longitudinal axis. The suspension system also includes a jack assembly attached to the damper and configured for raising and lowering the body with respect to the wheel. The jack assembly includes a seat abutting and rotatable about the damper, and a resilient member coiled about the damper and coupled to the seat so that the resilient member is not rotatable with respect to the seat. The jack assembly also includes a ball screw abutting and fixedly attached to the damper, wherein the ball screw is not rotatable about the damper. In addition, the jack assembly includes a ball nut abutting and rotatable about the ball screw and the damper. The jack assembly further includes a first clutch coiled about the ball nut and coupled to the seat, and a second clutch coiled about the damper and coupled to the ball nut. The seat is translatable along the damper to thereby raise and lower the body of the vehicle.

In one embodiment, the damper includes a first end attached to the body, and a second end spaced apart from the first end and attached to the wheel. The damper also includes a first tube defining a first cavity therein, and a second tube disposed within the first cavity and defining a second cavity therein, wherein the second tube is spaced apart from the first tube. Further, the damper includes a piston translatable within the second cavity along the central longitudinal axis. For this embodiment, the jack assembly includes a seat abutting and rotatable about the first tube, wherein the seat is translatable with respect to the first tube along the central longitudinal axis. The seat is also rotatable about the central longitudinal axis in a first direction as the resilient member extends and lengthens along the central longitudinal axis, and is rotatable about the central longitudinal axis in a second direction that is opposite the first direction as the resilient member compresses and shortens along the central longitudinal axis. The jack assembly also includes a resilient member coiled about the damper and coupled to the seat so that the resilient member is not rotatable with respect to the seat. In addition, the jack assembly includes a ball screw abutting and fixedly attached to the first tube, wherein the ball screw is not rotatable about the first tube and has a first extension and a second extension spaced apart from the first extension along the central longitudinal axis. Further, the jack assembly includes a ball nut abutting and rotatable about the ball screw and the first tube. The ball nut includes a helical portion having a third extension abuttable with the first extension to thereby restrict rotation of the ball nut with respect to the ball screw in the second direction. The ball nut also includes a casing portion mated to the helical portion and having a fourth extension abuttable with the second extension to thereby restrict rotation of the ball nut with respect to the ball screw in the first direction. The jack assembly also includes a first clutch coiled about the ball nut and coupled to the seat, wherein the first clutch is disposed between the first end and the ball screw along the central longitudinal axis. Further, the jack assembly includes a second clutch coiled about the first tube and coupled to the ball nut, wherein the second clutch is disposed between the first clutch and the second end along the central longitudinal axis. The seat is translatable along the first tube to thereby raise and lower the body of the vehicle as the resilient member alternately elongates and compresses along the central longitudinal axis.

A vehicle includes a body, a wheel configured for translating the body across a surface, and a suspension system interconnecting the body and the wheel. The suspension system includes a damper interconnecting the body and the wheel and having a central longitudinal axis. The suspension system also includes a jack assembly attached to the damper and configured for raising and lowering the body with respect to the wheel. The jack assembly includes a seat abutting and rotatable about the damper, and a resilient member coiled about the damper and coupled to the seat so that the resilient member is not rotatable with respect to the seat. The jack assembly also includes a ball screw abutting and fixedly attached to the damper, wherein the ball screw is not rotatable about the damper. Further, the jack assembly includes a ball nut abutting and rotatable about the ball screw and the damper. In addition, the jack assembly includes a first clutch coiled about the ball nut and coupled to the seat, and a second clutch coiled about the first tube and coupled to the ball nut. The seat is translatable along the damper to thereby raise and lower the body of the vehicle.

The detailed description and the drawings or Figures are supportive and descriptive of the disclosure, but the scope of the disclosure is defined solely by the claims. While some of the best modes and other embodiments for carrying out the claims have been described in detail, various alternative designs and embodiments exist for practicing the disclosure defined in the appended claims.

DETAILED DESCRIPTION

Figure 1:
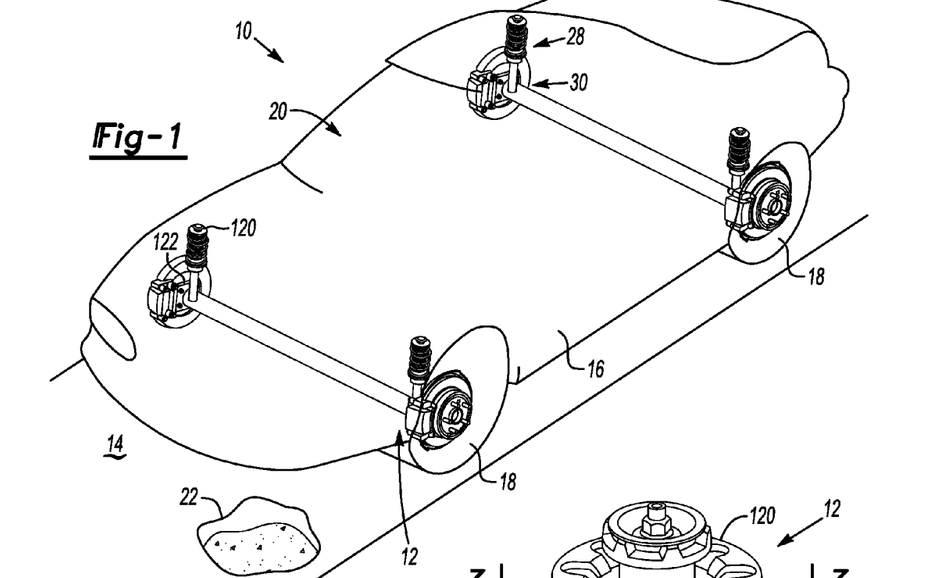
FIG. 1 is a schematic perspective illustration of vehicle including a suspension system.

Referring to the Figures, wherein like reference numerals refer to like elements, a vehicle 10 including a suspension system 12 is shown in FIG. 1. The vehicle 10 and suspension system 12 may be useful for applications requiring excellent vehicle aerodynamics and occupant comfort during vehicle steering maneuvers and/or vehicle travel over uneven surfaces 14. Therefore, the vehicle 10 and suspension system 12 may be useful for automotive vehicles, but may also be useful for non-automotive vehicles, such as, but not limited to, recreational vehicles and aircraft.

Referring again to FIG. 1, the vehicle 10 includes a body 16 and a wheel 18 configured for translating the body 16 across the surface 14. For example, the body 16 may define a passenger compartment 20 therein, and the vehicle 10 may include a plurality of wheels 18 configured for supporting and steering the body 16 as the vehicle 10 translates across the surface 14. Further, the body 16 may be characterized as a rigid member or a unibody. As set forth in more detail below and described with reference to FIG. 1, the vehicle 10 may further include a mount 120 configured for attaching the suspension system 12 to the body 16, and a steering component 122 configured for both steering the wheel 18 and attaching the suspension system 12 to the wheel 18. The mount 120 may be a component of a top mount assembly or plate (not shown) that may bolt or otherwise fixedly attach to the body 16 of the vehicle 10. The steering component 122 may be, by way of non-limiting examples, a steering knuckle, a tie rod, or a control arm. That is, the suspension system 12 may be attached to and disposed between the mount 120 and the steering component 122, as set forth in more detail below.

Further, with continued reference to FIG. 1, although shown only generally, it is to be appreciated that the surface 14 may be rough or uneven and may include or define irregularities such as uneven portions (indicated generally at 22), potholes, rumble strips, bumps, and/or indentations. Further, the vehicle 10 may be configured for translating across the surface 14 at a comparatively high rate of speed during a high-speed driving condition, e.g., a highway driving condition. Conversely, the vehicle 10 may be configured for translating across the surface 14 at a comparatively low rate of speed during a low-speed driving condition, e.g., a surface street driving condition.

With continued reference to FIG. 1, the vehicle 10 also includes the suspension system 12 interconnecting the body 16 and the wheel 18 and configured for optimizing vehicle steering, vehicle braking, and occupant comfort as the vehicle 10 translates across the surface 14. In particular, as set forth in more detail below, the suspension system 12 may control a height of the body 16 with respect to the surface 14 as the wheel 18 translates across the surface 14. More specifically, the suspension system 12 may raise and lower the body 16 of the vehicle 10 with respect to the wheel 18 according to whether the vehicle 10 is traveling at a comparatively high rate of speed during high-speed driving conditions, or at a comparatively low rate of speed during low-speed driving conditions. As such, the suspension system 12 may lower the body 16 of the vehicle 10 with respect to the wheel 18 to optimize vehicle aerodynamics during high-speed driving conditions, and may raise the body 16 of the vehicle 10 with respect to the wheel 18 to optimize clearance between the body 16 and the surface 14 during low-speed driving conditions. Further, the suspension system 12 may raise and lower the vehicle 10 to, for example, assist occupants with ingress into and/or egress from the passenger compartment 20 and/or provide additional body 16-to-surface 14 clearance for extreme or rough surface conditions.

Figure 2:
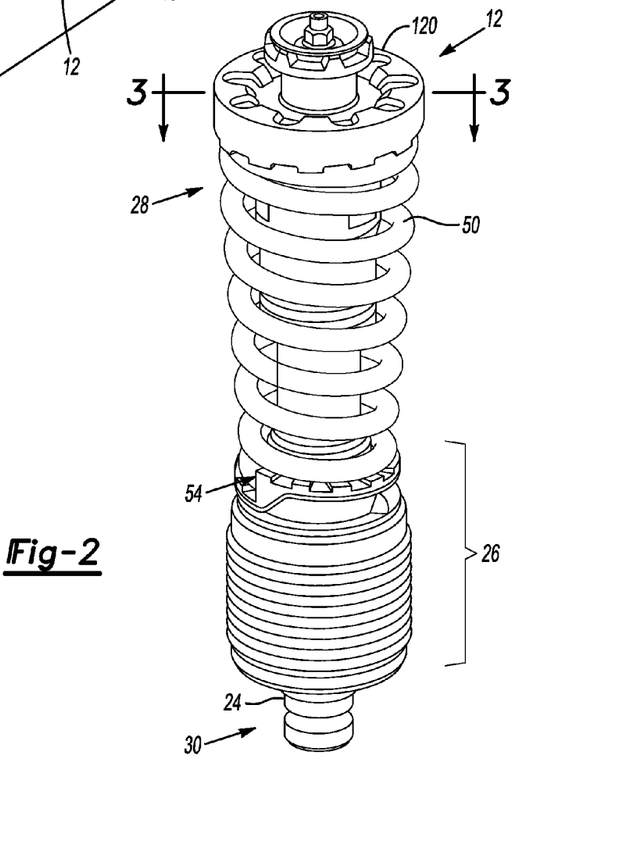
FIG. 2 is a schematic perspective illustration of the suspension system of FIG. 1.
Figure 3:
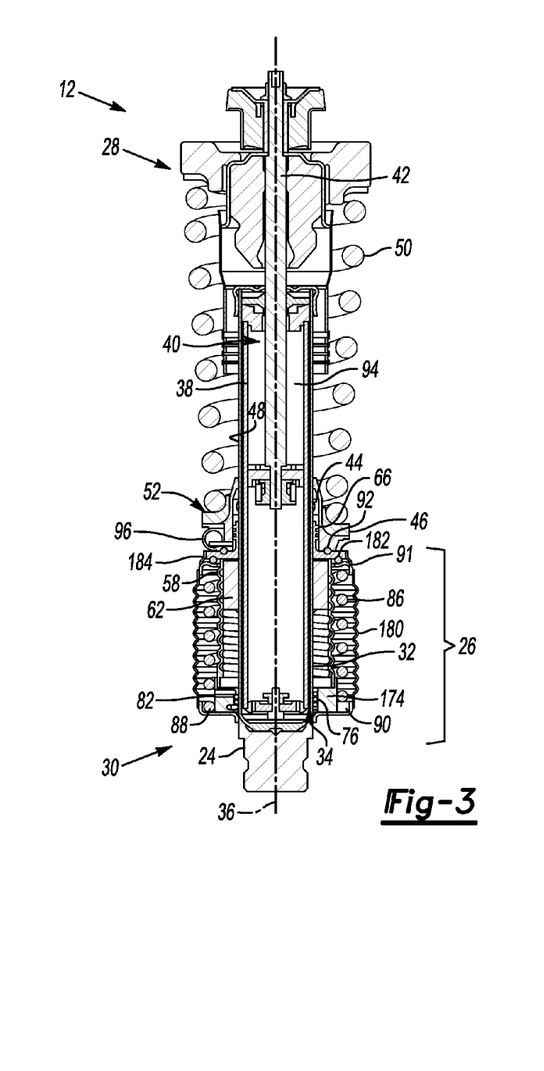
FIG. 3 is a schematic illustration of a cross-sectional partial view of the suspension system of FIG. 2, taken along section lines 3-3.
Figure 4:
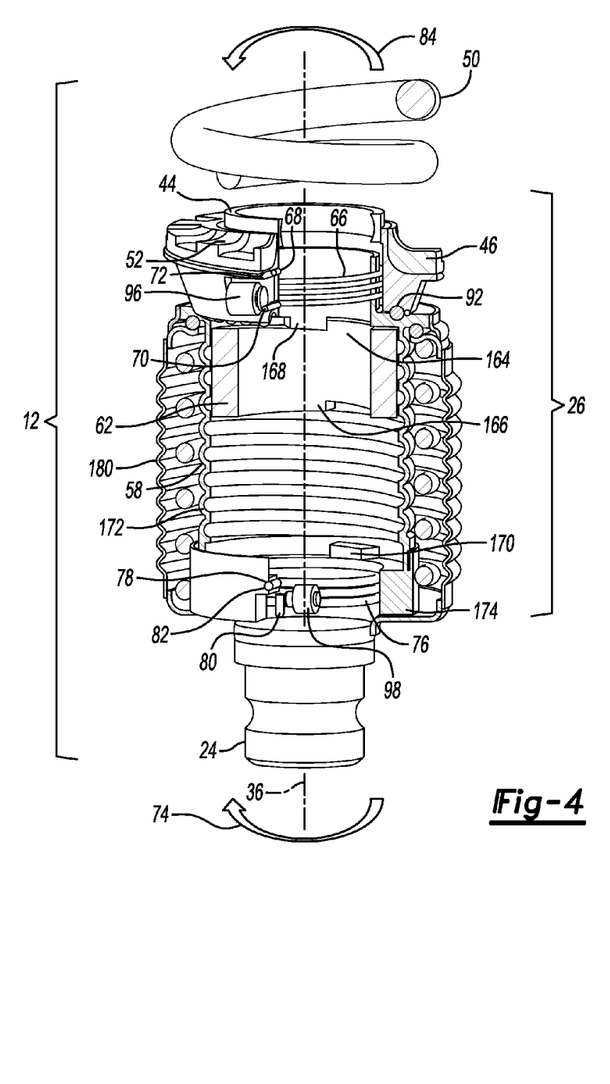
FIG. 4 is a schematic perspective illustration of a cross-sectional partially cutaway view of the suspension system of FIG. 2.

Referring now to FIGS. 2-4, the suspension system 12 includes a damper 24 and a jack assembly 26. As set forth in more detail below, the jack assembly 26 is attached to the damper 24 and is configured for raising and lowering the body 16 (FIG. 1) of the vehicle 10 (FIG. 1) with respect to the wheel 18 (FIG. 1).

In particular, referring now to FIG. 3, the damper 24 may include a first end 28 attached to the body 16 (FIG. 1) of the vehicle 10 (FIG. 1), and a second end 30 spaced apart from the first end 28 and attached to the wheel 18 (FIG. 1) of the vehicle 10. More specifically, as described with reference to FIG. 1, the first end 28 may be attached to the mount 120, and the second end 30 may be attached to the steering component 122. That is, the mount 120 may be disposed between and attached to the body 16 and the first end 28, and the steering component 122 may be attached to the wheel 18 and the second end 30. Further, the damper 24 has a central longitudinal axis 36, and may include a first tube 32 defining a first cavity 34 therein and a second tube 38 disposed within the first cavity 34. The second tube 38 may define a second cavity 40 therein and may be spaced apart from the first tube 32. That is, in one non-limiting example, the damper 24 may be a twin-tube damper and may be configured for minimizing forces transmitted to the body 16 (FIG. 1) as the wheel 18 translates across uneven portions 22 (FIG. 1) of the surface 14 (FIG. 1).

With continued reference to FIG. 3, the damper 24 may also include a piston 42 translatable within the second cavity 40 along the central longitudinal axis 36. The piston 42 may translate towards and away from the wheel 18 (FIG. 1) as the wheel 18 travels across the surface 14 (FIG. 1) and may compensate for jolts or bounces of the body 16 (FIG. 1) with respect to the surface 14. The piston 42 may sealingly abut the second tube 38. That is, the piston 42 may include a piston valve (not shown) that sealingly contacts the second tube 38 to divide the second cavity 40. Therefore, as the vehicle 10 (FIG. 1) translates across the surface 14, the piston 42 may translate along the central longitudinal axis 36 into and out of the second cavity 40, and thereby dampen oscillations of the body 16 as the wheel 18 travels over uneven portions 22 (FIG. 1) of the surface 14. In non-limiting examples, the damper 24 may be characterized as a High-Performance strut, i.e., HiPer strut, or a component of a short long-arm (SLA) suspension.

Referring again to FIG. 2, the suspension system 12 further includes the jack assembly 26 attached to the damper 24. As set forth above, the jack assembly 26 is configured for raising and lowering the body 16 (FIG. 1) of the vehicle 10 (FIG. 1) with respect to the wheel 18 (FIG. 1). For example, the jack assembly 26 may lower the body 16 of the vehicle 10 during high-speed driving conditions to improve an aerodynamic drag and fuel economy of the vehicle 10.

As described with reference to FIGS. 3 and 4, the jack assembly 26 includes a seat 46 abutting and rotatable about the damper 24, e.g., the first tube 32 (FIG. 3) of the damper 24. In one non-limiting example, the seat 46 may be annular and may surround and contact an external surface 48 (FIG. 3) of the first tube 32. Further, the seat 46 may be coaxial with the central longitudinal axis 36 and may be rotatable with respect to the first tube 32 so that the seat 46 is translatable along the first tube 32. That is, the seat 46 may abut the first tube 32 and may be translatable with respect to the first tube 32 along the central longitudinal axis 36 to thereby raise and lower the body 16 (FIG. 1) of the vehicle 10 (FIG. 1).

With continued reference to FIG. 3, the suspension system 12 may also include one or more seals 44 disposed between the external surface 48 of the first tube 32 and the seat 46. The one or more seals 44 may be configured for allowing sealed translation of the seat 46 along the external surface 48, and may minimize contamination and/or wear of the external surface 48 from, for example, debris and/or fluid. In one non-limiting example, the one or more seals 44 may be an annular o-ring seal formed from an elastomeric material and may abut the external surface 48 and the seat 46.

As shown in FIGS. 3 and 4, the suspension system 12 may further include a resilient member 50, e.g., a coiled spring, affixed to the first end 28, coiled about the damper 24, and coupled to the seat 46 so that the resilient member 50 is not rotatable with respect to the seat 46. The resilient member 50 may support the body 16 (FIG. 1) and may further assist in dampening oscillations of the body 16 as the vehicle 10 (FIG. 1) travels along an uneven portion 22 (FIG. 1) of the surface 14 (FIG. 1). In particular, extension and compression of the resilient member 50 may wind and unwind the resilient member 50 about the central longitudinal axis 36 to thereby induce a torque between the first end 28 and the second end 30.

Figures 5, 6:
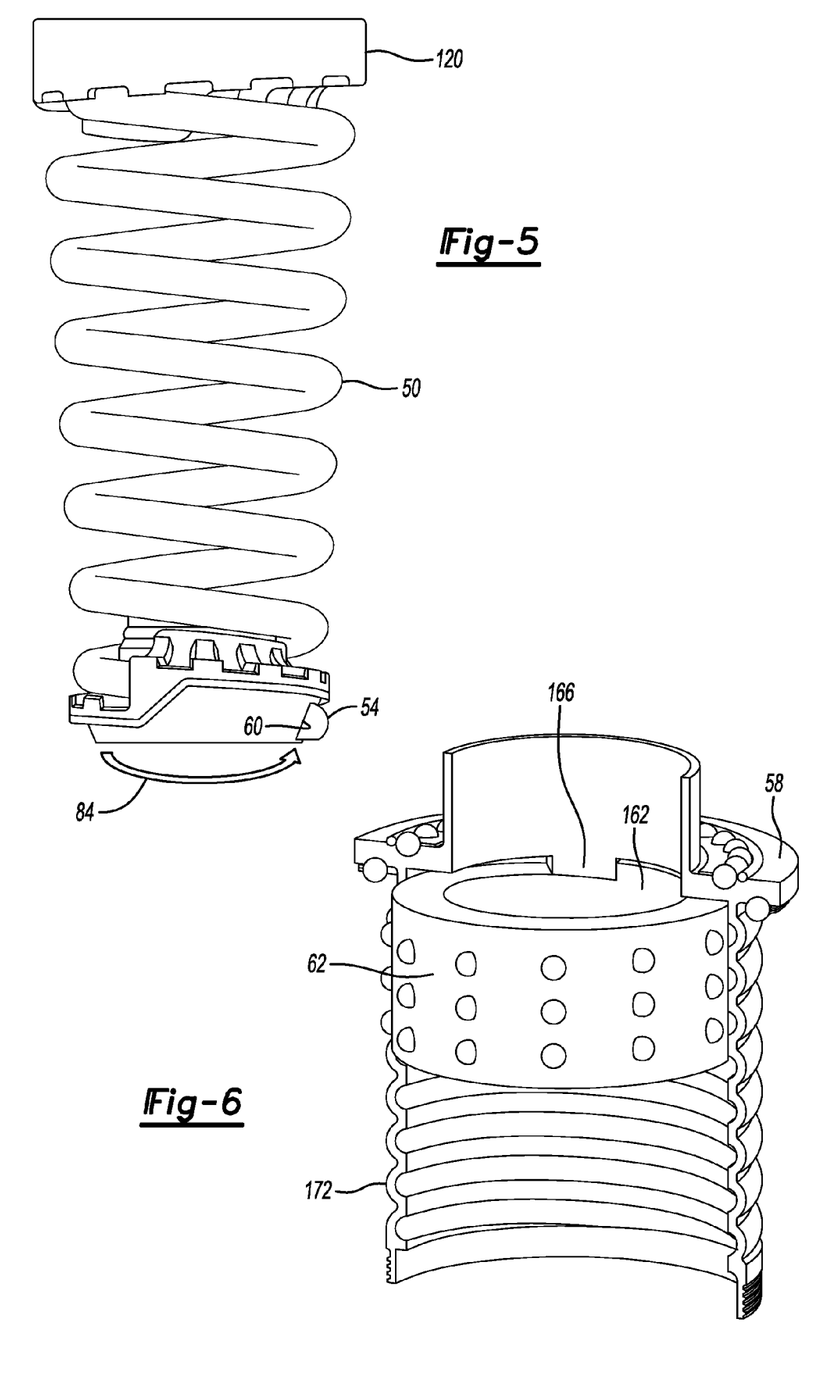
FIG. 5 is a schematic perspective illustration of a side view of a resilient member and a seat of the suspension system of FIGS. 2-4.
FIG. 6 is a schematic perspective illustration of a partial cutaway view of a ball screw and a ball nut of the suspension system of FIGS. 2-5.

Referring to FIG. 3, the resilient member 50 may be coiled about the first tube 32 and may be coupled to the seat 46. For example, the resilient member 50 may include an end 54 (FIG. 5) resting within a pocket 52 defined by the seat 46 and having a mating surface 60 (FIG. 5) such that the resilient member 50 may not rotate about the central longitudinal axis 36 with respect to the seat 46. However, the end 54 may abut the mating surface 60 so that the seat 46 may rotate about the central longitudinal axis 36 with respect to the damper 24, e.g., the first tube 32, to thereby transfer torque induced by extension and compression of the resilient member 50 as set forth in more detail below. That is, the resilient member 50 is not rotatable with respect to the seat 46, and the seat 46 may support and contact the resilient member 50. The seat 46 may be a lower spring seat of the suspension system 12.

Referring again to FIG. 3, the seat 46 may be rotatable about the central longitudinal axis 36 in a first direction (denoted generally by arrow 84 in FIG. 4), e.g., counterclockwise, as the resilient member 50 extends and lengthens along the central longitudinal axis 36. Conversely, the seat 46 may be rotatable about the central longitudinal axis 36 in a second direction (denoted generally by arrow 74 in FIG. 4), e.g., clockwise, that is opposite the first direction 84 as the resilient member 50 compresses and shortens along the central longitudinal axis 36.

Referring again to FIGS. 3 and 4, the jack assembly 26 further includes a ball screw 62 abutting and fixedly attached to the damper 24, e.g., the first tube 32. For example, the ball screw 62 may be annular, may surround and abut the external surface 48 (FIG. 3) of the first tube 32, may be coaxial with the central longitudinal axis 36, but may not rotate with respect to the central longitudinal axis 36. That is, the ball screw 62 is not rotatable about the damper 24, e.g., about the first tube 32. In addition, as best shown in FIG. 4, the ball screw 62 may have a first extension 164 and a second extension 166 spaced apart from the first extension 164 along the central longitudinal axis 36, wherein each of the first extension 164 and the second extension 166 are configured for limiting rotation of the seat 46, and thereby limiting translation of the seat 46 along the damper 24 as set forth in more detail below.

With continued reference to FIGS. 3 and 4, the jack assembly 26 further includes a ball nut 58 abutting and rotatable about the ball screw 62 and the damper 24. That is, the ball nut 58 may abut and rotate about the first tube 32. For example, the ball nut 58 may be annular, may surround and abut the external surface 48 (FIG. 3) of the first tube 32, and may be coaxial with the central longitudinal axis 36. The ball nut 58 may be configured for selectively rotating about the central longitudinal axis 36, as set forth in more detail below, and the ball screw 62 may be disposed between the ball nut 58 and the first tube 32.

As best shown in FIG. 4, the ball nut 58 may have a helical portion 172 having a third extension 168 abuttable with the first extension 164 to thereby restrict rotation of the ball nut 58 with respect to the ball screw 62 in the second direction 74. That is, as set forth in more detail below, the third extension 168 may abut the first extension 164 to provide a stop when the seat 46 is disposed in a lowest position (shown generally in FIG. 4) along the central longitudinal axis 36, i.e., a completely lowered position with respect to the wheel 18 (FIG. 1). Further, the ball nut 58 may include a casing portion 174 mated to the helical portion 172 and having a fourth extension 170 abuttable with the second extension 166 to thereby restrict rotation of the ball nut 58 with respect to the ball screw 62 in the first direction 84. That is, as set forth in more detail below, the fourth extension 170 may abut the second extension 166 to provide a stop when the seat 46 is disposed in a highest position (not shown) along the central longitudinal axis 36, i.e., a completely raised position with respect to the wheel 18. Further, the casing portion 174 may be integral with the helical portion 172, or the casing portion 174 and the helical portion 172 may be two separate components.

Figure 7:
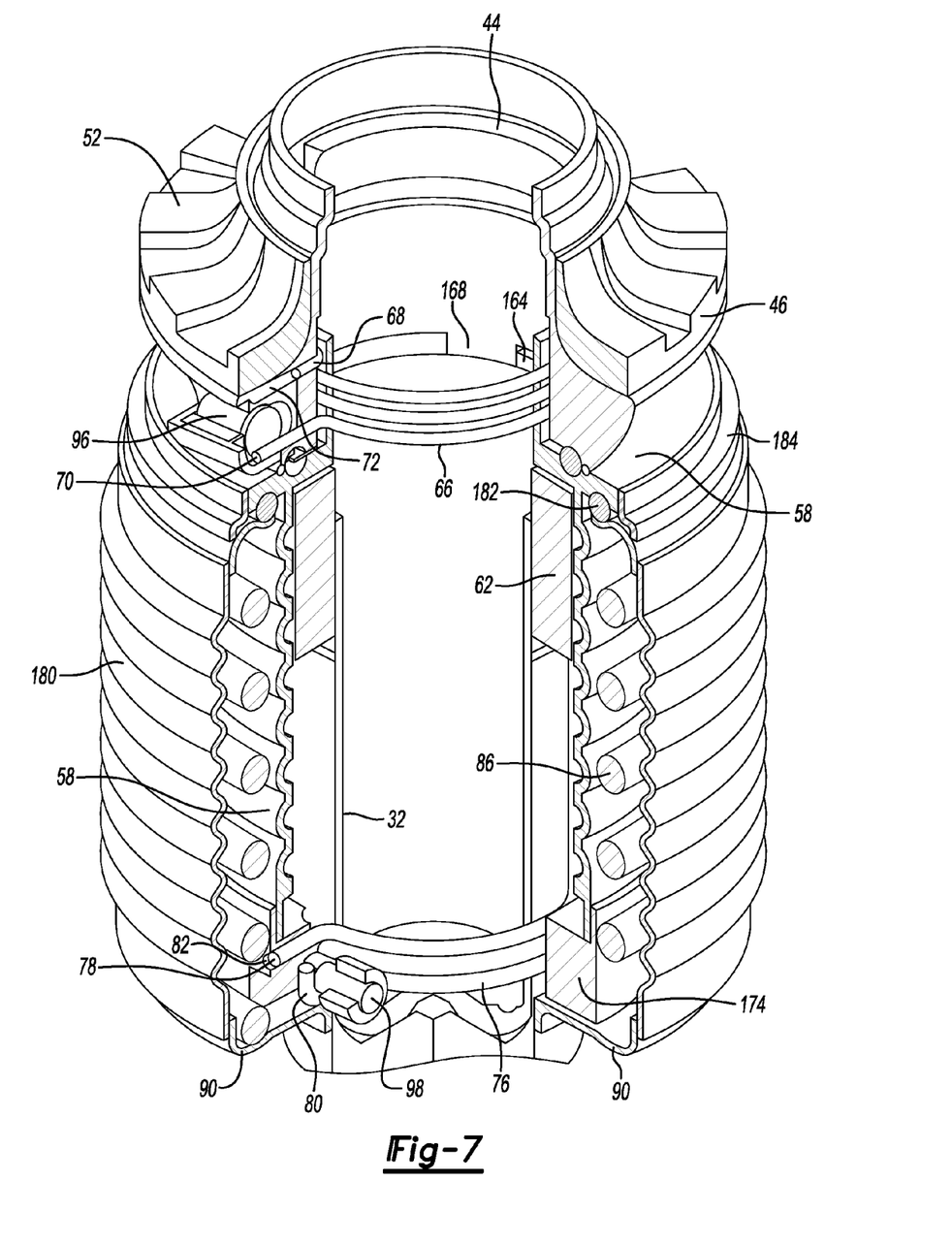
FIG. 7 is a schematic perspective illustration of a partial cutaway view of the jack assembly of the suspension system of FIGS. 2-6.

Referring now to FIG. 7, the jack assembly 26 also includes a first clutch 66 coiled about the ball nut 58 and coupled to the seat 46. In one non-limiting example, the first clutch 66 may be configured as an annular wire having a fixed end 68 and a clutch end 70 spaced apart from the fixed end 68. The fixed end 68 may be fixedly inserted into a void 72 defined by the seat 46 to thereby mate the first clutch 66 to the seat 46. Therefore, as the seat 46 rotates about the central longitudinal axis 36, the first clutch 66 may also rotate about the central longitudinal axis 36. The first clutch 66 may be disposed between the first end 28 and the ball screw 62 along the central longitudinal axis 36. The first clutch 66 may be configured to operate unidirectionally, and may engage the ball nut 58 for rotation of the seat 46 in the first direction (denoted generally by arrow 84 in FIG. 4), e.g., counterclockwise. That is, the first clutch 66 may be a one-way clutch that allows for relative rotation between the ball nut 58 and the seat 46, but only in one direction, and includes infinite locking positions as opposed to only locking into position after a given condition is satisfied.

With continued reference to FIG. 7, the jack assembly 26 also includes a second clutch 76 coiled about the damper 24, e.g., the first tube 32, and coupled to the ball nut 58. For example, the second clutch 76 may be configured as an annular wire having an affixed end 78 and an engaging end 80 spaced apart from the affixed end 78. The affixed end 78 may be fixedly inserted into a recession 82 defined by the casing portion 174 of the ball nut 58 to thereby mate the second clutch 76 to the ball nut 58. Therefore, as the ball nut 58 rotates about the central longitudinal axis 36, the second clutch 76 may also rotate about the central longitudinal axis 36. The second clutch 76 may also be configured to operate unidirectionally, and may engage the first tube 32 and/or the ball nut 58 as set forth in more detail below. That is, the second clutch 76 may be a one-way clutch that allows for relative rotation between the ball nut 58 and the ball screw 62, but only in one direction, and includes infinite locking positions as opposed to only locking into position after a given condition is satisfied. Further, as best shown in FIG. 3, the second clutch 76 may be disposed between the first clutch 66 and the second end 30 along the central longitudinal axis 36.

Referring again to FIG. 3, the jack assembly 26 may further include a dust boot cover 180 configured for protecting the ball nut 58 from contaminants such as debris, dust, and/or fluid. The dust boot cover 180 may be formed from a flexible material and may have an accordion shape that includes a plurality of ridges. The dust boot cover 180 may be attached to and spaced apart from the helical portion 172 of the ball nut 58 to define a channel 90 between the dust boot cover 180 and the ball nut 58. The jack assembly 26 may also include a bearing 182 disposed within the channel 90, and a bearing seal 184 disposed in contact with the dust boot cover 180 and the helical portion 172 of the ball nut 58, wherein the bearing seal 184 is configured for protecting the bearing 182 from contaminants such as debris, dust, and/or fluid.

In addition, with continued reference to FIG. 3, the jack assembly 26 may further include a spring 86 coiled about the helical portion 172 of the ball nut 58. For example, the spring 86 may rest within the channel 90. The spring 86 may be configured for supporting a portion of a corner curb load of the vehicle 10 (FIG. 1) that would otherwise act on the ball screw 62. As such, the spring 86 may minimize a force required to rotate the ball nut 58 about the central longitudinal axis 36 by reducing an amount of corner curb load on the ball screw 62, and by reducing an amount of friction between the ball nut 58 and the ball screw 62. The aforementioned bearing 182 may decouple a rotational motion of the ball nut 58 from a rotational motion of the spring 86 when the spring 86 is compressed and extended.

In addition, as best shown in FIG. 4, the jack assembly 26 may further include a plurality of ball bearings 92 sandwiched between the seat 46 and the ball nut 58. The plurality of ball bearings 92 may reduce friction between the seat 46 and the ball nut 58 as the seat 46 and/or ball nut 58 rotates about the central longitudinal axis 36.

Therefore, as described with reference to FIG. 3 and set forth in more detail below, as the vehicle 10 (FIG. 1) translates across the surface 14 (FIG. 1), the piston 42 may translate along the central longitudinal axis 36 into and out of the second cavity 40, and thereby dampen oscillations of the body 16 (FIG. 1) as the wheel 18 (FIG. 1) travels over uneven portions 22 (FIG. 1) of the surface 14. Further, the seat 46 is translatable along the damper 24, e.g., the first tube 32, to thereby raise and lower the body 16 of the vehicle 10 as the resilient member 50 alternately elongates and compresses along the central longitudinal axis 36. In addition, a fluid 94, e.g., a hydraulic fluid, may be disposed within the second cavity 40 and may also assist in dampening oscillations of the body 16.

Figure 8A:
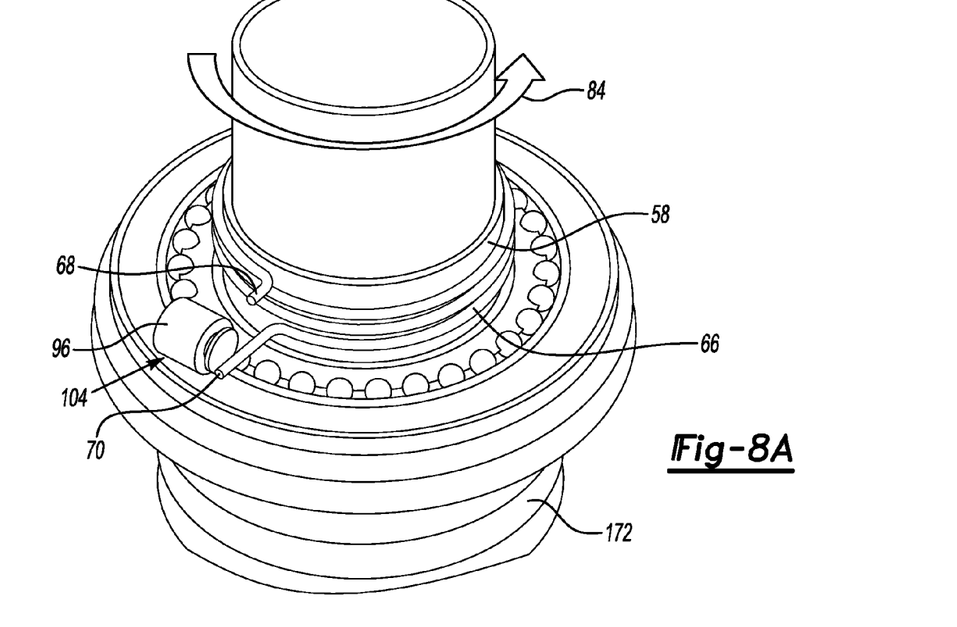
FIG. 8A is a schematic perspective illustration of a portion of the jack assembly of FIG. 7, wherein a first solenoid is disposed in a de-energized state.
Figure 8B:
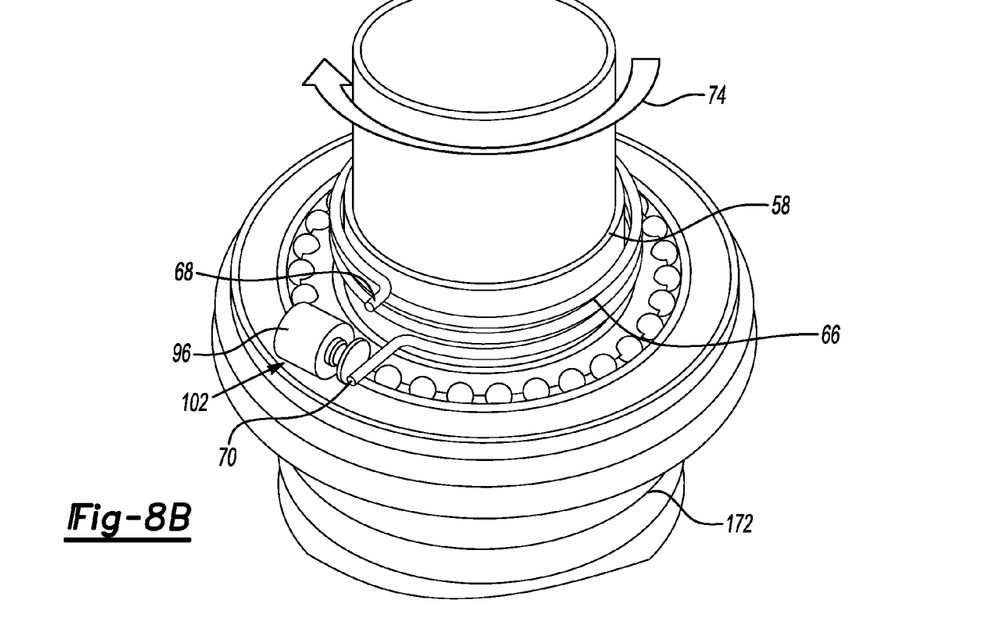
FIG. 8B is a schematic perspective illustration of a portion of the jack assembly of FIG. 8A, wherein the first solenoid is disposed in an energized state.
Figures 9A, 9B:
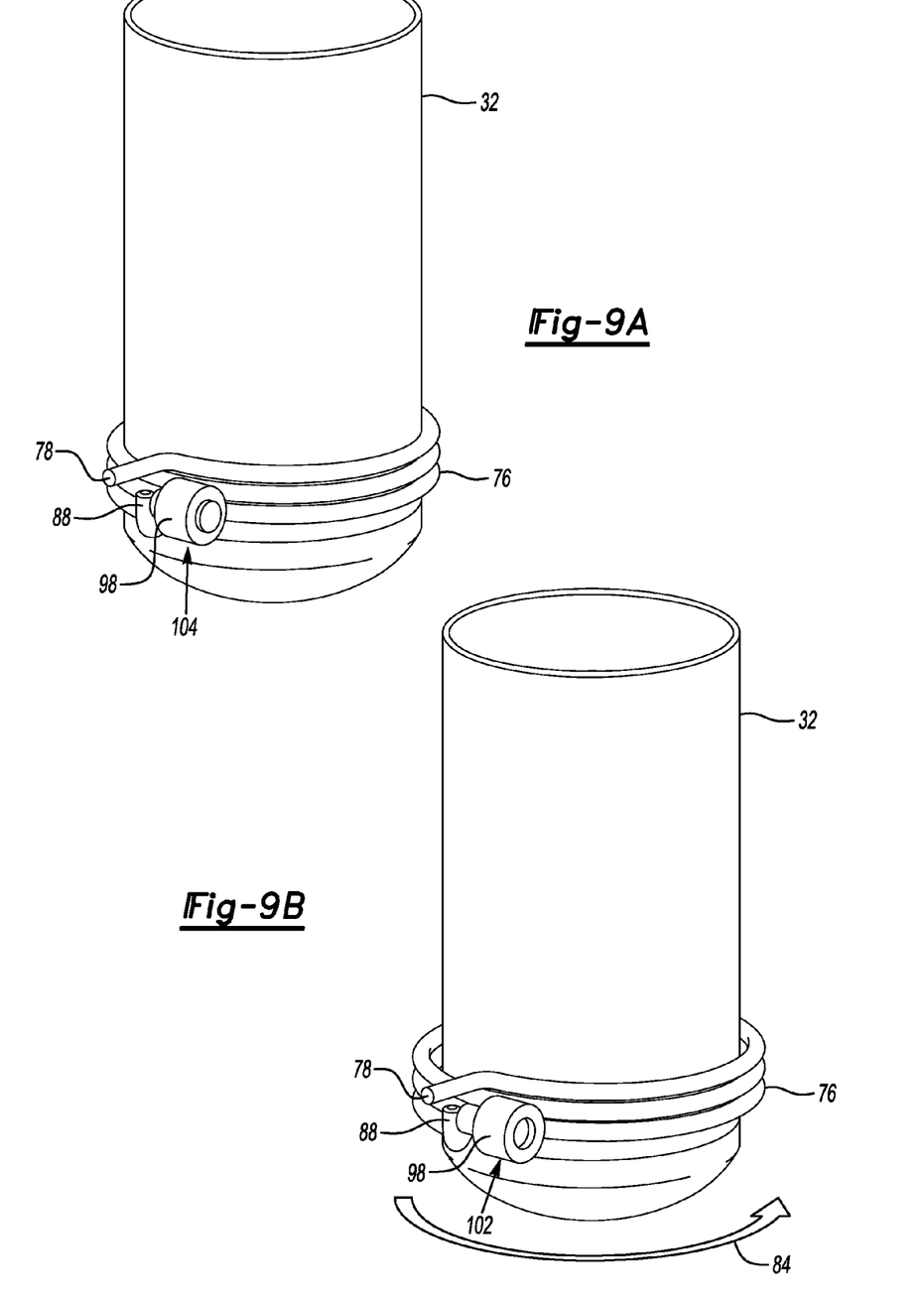
FIG. 9A is a schematic perspective illustration of a portion of the jack assembly of FIG. 7, wherein a second solenoid is disposed in a de-energized state.
FIG. 9B is a schematic perspective illustration of a portion of the jack assembly of FIG. 9A, wherein the second solenoid is disposed in an energized state.

In particular, referring again to FIGS. 4 and 7, the jack assembly 26 may further include a first solenoid 96 configured for engaging the first clutch 66, and a second solenoid 98 configured for engaging the second clutch 76. Each of the first solenoid 96 and the second solenoid 98 may be any type of solenoid, and may have any number of states or positions. Further, the first solenoid 96 may be the same as or different from the second solenoid 98. In one non-limiting example, each of the first solenoid 96 and the second solenoid 98 may be transitionable between an energized state 102 (FIGS. 8B and 9B) and a de-energized state 104 (FIGS. 8A and 9A).

Referring now to FIG. 4, the jack assembly 26 may raise the seat 46 and the body 16 (FIG. 1) of the vehicle 10 (FIG. 1) away from the wheel 18 (FIG. 1). For example, the jack assembly 26 may raise the seat 46 and the body 16 of the vehicle 10 for low-speed driving conditions in which the wheel 18 translates over an uneven portion 22 (FIG. 1) of the surface 14 (FIG. 1) to thereby provide ground clearance between the body 16 and the surface 14. That is, the suspension system 12 may raise the body 16 of the vehicle 10 from the lowered position (shown generally in FIG. 4) to a raised position.

With continued reference to FIG. 4, during a jounce event in which the wheel 18 (FIG. 1) translates across an uneven portion 22 (FIG. 1) of the surface 14 (FIG. 1) and causes the body 16 (FIG. 1) to momentarily drop toward the wheel 18, the resilient member 50 may compress along the central longitudinal axis 36 and cause the first end 28 to move towards the second end 30 (FIG. 3). That is, as the resilient member 50 compresses or shortens along the central longitudinal axis 36, the end 54 (FIG. 2) of the resilient member 50 may attempt to rotate about the central longitudinal axis 36 in the second direction 74, e.g., clockwise. Conversely, during a rebound event in which the wheel 18 translates across an even portion of the surface 14, the body 16 may momentarily translate away from the wheel 18, decompress or elongate the resilient member 50, and cause the second end 30 to move away from the first end 28. As the resilient member 50 extends and lengthens and pushes down against the seat 46, the end 54 (FIG. 2) of the resilient member 50 may attempt to rotate about the central longitudinal axis 36 in the first direction 84, e.g., counterclockwise. As such, during each jounce and rebound event, the jack assembly 26 may harness the aforementioned incremental rotation of the end 54 of the resilient member 50 to thereby convert the rotation into an elevation change of the seat 46 along the central longitudinal axis 36 via an angle of inclination of the ball nut 58 and the ball screw 62.

Therefore, with continued reference to FIG. 3, as the suspension system 12 cycles, i.e., alternately compresses and elongates the resilient member 50 along the central longitudinal axis 36, incremental rotations of the end 54 (FIG. 5) of the resilient member 50 caused by elongation of the resilient member 50 may rotate the ball nut 58 to thereby raise the seat 46 and the body 16 (FIG. 1) of the vehicle 10 (FIG. 1) with respect to the wheel 18 (FIG. 1). For example, the suspension system 12 may raise the body 16 by from about 0.1 mm to about 0.3 mm for every about 25 mm of compression and elongation of the resilient member 50. Therefore, about 200 cycles, wherein one cycle is equivalent to about 12.5 mm of compression and about 12.5 mm of subsequent elongation of the resilient member 50, may raise the body 16 away from the wheel 18 by about 40 mm.

Referring to FIGS. 4 and 8A, to raise the body 16 (FIG. 1) away from the wheel 18 (FIG. 1), the first solenoid 96 and the second solenoid 98 (FIG. 9A) may be disposed in the de-energized state 104. When the first solenoid 96 and the second solenoid 98 are disposed in the de-energized state 104, the ball nut 58 may be rotatable about the central longitudinal axis 36 in the first direction 84 with respect to the ball screw 62 to thereby raise the body 16 of the vehicle 10 with respect to the wheel 18. As the first end 28 (FIG. 3) compresses along the central longitudinal axis 36 towards the second end 30 (FIG. 3) during a jounce event, the end 54 (FIG. 5) of the resilient member 50 may attempt to rotate in the first direction 84, e.g., counterclockwise. Concurrently, the first clutch 66 may engage with the ball nut 58, e.g., coil or wrap around the ball nut 58, and thereby cause the seat 46 and the ball nut 58 to rotate together about the central longitudinal axis 36 in the first direction 84. That is, the first solenoid 96 and the second solenoid 98 may each be disposed in the de-energized state 104 so that the first clutch 66 may abut the ball nut 58, and the seat 46 and the ball nut 58 may rotate together about the ball screw 62 to thereby raise the body 16 of the vehicle 10 with respect to the wheel 18. As the ball nut 58 rotates upwards along the first tube 32 of the damper 24 towards the first end 28, the ball nut 58 may translate the seat 46 along the central longitudinal axis 36 away from the wheel 18 (FIG. 1), and thereby raise the body 16 (FIG. 1) with respect to the wheel 18.

Likewise, referring to FIGS. 4 and 9A, when the first solenoid 96 (FIG. 8A) and the second solenoid 98 are disposed in the de-energized state 104, the second clutch 76 may coil or wrap around and abut the first tube 32 so that the ball nut 58 and the second clutch 76 rotate in the first direction 84 together. More specifically, the casing portion 174 of the ball nut 58 may about the affixed end 78 (FIG. 9A) and rotate in the first direction 84 to thereby wrap the second clutch 76 about the first tube 32. Since the first tube 32 is stationary and may not rotate about the central longitudinal axis 36, the ball nut 58 may remain in position and not rotate about the central longitudinal axis 36 in the second direction 74 regardless of an amount of torque transferred to the ball nut 58.

Further, referring again to FIGS. 4, 8A, and 9A, the first solenoid 96 (FIG. 8A) and the second solenoid 98 (FIG. 9A) may be disposed in the de-energized state 104 so that the ball nut 58 is stationary with respect to the ball screw 62 in the second direction 74, and the seat 46 is rotatable with respect to the ball nut 58 about the central longitudinal axis 36 in the second direction 74. More specifically, as the resilient member 50 compresses and shortens, the end 54 (FIG. 5) may rotate the seat 46 about the central longitudinal axis 36 in the second direction 74 with respect to the ball nut 58. That is, the first clutch 66 may unwind or uncoil from the ball nut 58, and the first clutch 66 and the seat 46 may rotate in the second direction 74.

However, under this condition, the ball nut 58 may not rotate about the central longitudinal axis 36 with respect to the ball screw 62 in the second direction 74, but may rather retain a vertical position along the central longitudinal axis 36. Similarly, since the second solenoid 98 (FIG. 9A) is disposed in the de-energized state 104, the second clutch 76 may wrap around the stationary first tube 32. As such, the casing portion 174 of the ball nut 58 may not rotate about the central longitudinal axis 36. Such ratcheting of the jack assembly 26 may continue as the resilient member 50 is alternately compressed and elongated during wheel travel across the surface 14 (FIG. 1) until the ball nut 58 is disposed at a desired elevation along the first tube 32. The suspension system 12 may remain in the raised position for any desired duration, e.g., until the vehicle 10 (FIG. 1) is no longer operated under a low-speed driving condition.

To limit vertical travel while raising, as described with reference to FIG. 4, the second extension 166 may abut the fourth extension 170 to set an upper position of the suspension system 12. The travel-limiting feature may also prevent binding of the ball nut 58 and ball screw 62. When the suspension system 12 is disposed in the raised position, i.e., a highest vertical position along the central longitudinal axis 36, the second solenoid 98 may be disposed in the de-energized state 104 (FIG. 9A) and the fourth extension 170 may abut the second extension 166 so that the ball nut 58 is not rotatable with respect to the ball screw 62 in the first direction 84. During this condition, the first solenoid 96 (FIG. 8A) may be disposed in the de-energized state 104 (FIG. 8A) or the energized state 102 (FIG. 8B)

Referring again to FIG. 4, the suspension system 12 may lower the seat 46 and the body 16 (FIG. 1) of the vehicle 10 (FIG. 1) toward the wheel 18 (FIG. 1). For example, the suspension system 12 may lower the seat 46 and the body 16 for high-speed driving conditions in which the wheel 18 may translate over a comparatively-even portion of the surface 14 (FIG. 1) to thereby improve aerodynamic drag and fuel economy of the vehicle 10.

With continued reference to FIG. 4, to lower the body 16 (FIG. 1) towards from the wheel 18 (FIG. 1), the first solenoid 96 (FIG. 8B) and the second solenoid 98 (FIG. 9B) may be disposed in the energized state 102 (FIGS. 8B and 9B) so that the ball nut 58 is rotatable about the central longitudinal axis 36 in the second direction 74 with respect to the ball screw 62 to thereby lower the body 16 of the vehicle 10 with respect to the wheel 18. More specifically, referring to FIG. 8B, when the first solenoid 96 is disposed in the energized state 102, the first solenoid 96 may push against the clutch end 70 of the first clutch 66 in the first direction 84. Similarly, referring to FIG. 9B, when the second solenoid 98 is disposed in the energized state 102, the second solenoid 98 may push against the engaging end 80 of the second clutch 76 in the second direction 74. Further, a static load of the body 16 of the vehicle 10 may rotate the ball nut 58 in the second direction 74 to thereby lower the body 16 of the vehicle 10 with respect to the wheel 18.

To limit vertical travel while lowering, as described with reference to FIG. 4, the first extension 164 may abut the third extension 168 to set a lower position of the suspension system 12. This travel-limiting feature may also prevent binding of the ball nut 58 and the ball screw 62. That is, when the suspension system 12 is disposed in the lowered position, i.e., a lowest vertical position along the central longitudinal axis 36, the first solenoid 96 (FIG. 8B) may be disposed in the energized state 102 (FIG. 8B) and the second solenoid 98 (FIG. 9A) may be disposed in the de-energized state 104 (FIG. 9A), and the third extension 168 may abut the first extension 164 so that the ball nut 58 is not rotatable with respect to the ball screw 62 in the first direction 84. The suspension system 12 may remain in the lowered position for any desired duration, e.g., until the vehicle 10 is no longer operated under a high-speed driving condition.

In addition, although the suspension system 12 is exemplified herein wherein the first direction 84 is counterclockwise rotation, and the second direction 74 is clockwise rotation, the suspension system 12 may operate in reverse, i.e., wherein the first direction 84 refers to clockwise rotation and the second direction 74 refers to counterclockwise rotation. Further, although not shown, the suspension system 12 may operate in an upside-down configuration wherein the jack assembly 26 is disposed above the resilient member 50 along the central longitudinal axis 36, and the resilient member 50 may retract or shorten along the central longitudinal axis 36 to rotate the seat 46 in the first direction 84, e.g., counterclockwise, and extend or lengthen along the central longitudinal axis 36 to rotate the seat 46 in the second direction 74, e.g., clockwise.

Therefore, in summary and described with reference to FIGS. 3 and 4, the piston 42 may alternately cycle towards and away from the wheel 18 (FIG. 1) along the central longitudinal axis 36 as the wheel 18 translates the body 16 (FIG.

1) across the surface 14 (FIG. 1) to thereby harness rotational motion of the end 54 of the resilient member 50 to raise or lower the seat 46 and the body 16 with respect to the wheel 18. As such, the suspension system 12 may be self-powered and may harness kinetic and potential energy otherwise dissipated by the damper 24 and the fluid 94 (FIG. 3) to actuate the jack assembly 26. That is, jounce and rebound travel of the piston 42 as the wheel 18 translates across an uneven portion 22 (FIG. 1) of the surface 14 may provide energy for raising the seat 46 and the body 16 with respect to the wheel 18, and stored potential energy of the body 16 of the vehicle 10 may provide energy for lowering the seat 46 and the body 16 with respect to the wheel 18.

Consequently, the suspension system 12 is economical and may provide self-powered control of a height of the body 16 (FIG. 1) with respect to the surface 14 (FIG. 1). That is, the suspension system 12 may provide sufficient suspension travel and/or ground clearance for the vehicle 10 (FIG. 1). Therefore, the suspension system 12 may improve aerodynamic drag and fuel economy for the vehicle 10, while also providing for convenient ingress into and egress from the passenger compartment 20 (FIG. 1). More specifically, the suspension system 12 may provide reduced aerodynamic drag for high-speed driving conditions, and sufficient ground clearance for low-speed driving conditions through a natural cycling of the piston 42 (FIG. 3) within the damper 24. In addition, advantageously, the damper 24 may operate independent of the jack assembly 26. That is, the piston 42 may continue to translate along the central longitudinal axis 36 within the second cavity 40 whether the body 16 and suspension system 12 are disposed in a raising-, raised-, lowering-, lowered-, or any-position therebetween.

While the best modes for carrying out the disclosure have been described in detail, those familiar with the art to which this disclosure relates will recognize various alternative designs and embodiments for practicing the disclosure within the scope of the appended claims.

The invention claimed is:

1. A suspension system for a vehicle, the suspension system comprising:
    a damper interconnecting a body and a wheel of the vehicle and having a central longitudinal axis; and
    a jack assembly attached to the damper and configured for raising and lowering the body with respect to the wheel, wherein the jack assembly includes:
        a seat abutting and rotatable about the damper;
        a resilient member coiled about the damper and coupled to the seat so that the resilient member is not rotatable with respect to the seat;
        wherein the seat is rotatable about the central longitudinal axis in a first direction as the resilient member extends and lengthens along the central longitudinal axis, and is rotatable about the central longitudinal axis in a second direction that is opposite the first direction as the resilient member compresses and shortens along the central longitudinal axis;
        a ball screw abutting and fixedly attached to the damper, wherein the ball screw is not rotatable about the damper;
        a ball nut abutting and rotatable about the ball screw and the damper;
        a first clutch coiled about the ball nut and coupled to the seat;
        a second clutch coiled about the damper and coupled to the ball nut;
        wherein the seat is translatable along the damper to thereby raise and lower the body of the vehicle;
        a first solenoid configured for engaging the first clutch; and
        a second solenoid configured for engaging the second clutch, wherein each of the first solenoid and the second solenoid is transitionable between an energized state and a de-energized state.

2. The suspension system of claim 1, wherein the first solenoid and the second solenoid are disposed in the de-energized state so that the ball nut is rotatable about the central longitudinal axis in the first direction with respect to the ball screw to thereby raise the body of the vehicle with respect to the wheel.

3. The suspension system of claim 1, wherein the first solenoid and the second solenoid are disposed in the de-energized state so that the ball nut is stationary with respect to the ball screw in the second direction and the seat is rotatable with respect to the ball nut about the central longitudinal axis in the second direction.

4. The suspension system of claim 1, wherein the ball screw includes a first extension and a second extension spaced apart from the first extension along the central longitudinal axis, and further wherein the ball nut includes:
    a helical portion having a third extension abuttable with the first extension to thereby restrict rotation of the ball nut with respect to the ball screw in the second direction; and
    a casing portion mated to the helical portion and having a fourth extension abuttable with the second extension to thereby restrict rotation of the ball nut with respect to the ball screw in the first direction.

5. The suspension system of claim 4, wherein the second solenoid is disposed in the de-energized state and the fourth extension abuts the second extension so that the ball nut is not rotatable with respect to the ball screw in the second direction.

6. The suspension system of claim 5, wherein the first solenoid is disposed in the de-energized state.

7. The suspension system of claim 5, wherein the first solenoid is disposed in the energized state.

8. The suspension system of claim 1, wherein the first solenoid and the second solenoid are disposed in the energized state so that the ball nut is rotatable about the central longitudinal axis in the second direction with respect to the ball screw to thereby lower the body of the vehicle with respect to the wheel.

9. The suspension system of claim 4, wherein the first solenoid is disposed in the energized state and the second solenoid is disposed in the de-energized state and the third extension abuts the first extension so that the ball nut is not rotatable with respect to the ball screw in the first direction.

10. The suspension system of claim 1, wherein the jack assembly further includes a plurality of ball bearings sandwiched between the seat and the ball nut.

11. The suspension system of claim 1, wherein the jack assembly further includes a spring coiled about the ball nut.

12. A suspension system for a vehicle, the suspension system comprising:
    a damper interconnecting a body and a wheel of the vehicle and having a central longitudinal axis, wherein the damper includes:
        a first end attached to the body;
        a second end spaced apart from the first end and attached to the wheel;
        a first tube defining a first cavity therein;
        a second tube disposed within the first cavity and defining a second cavity therein, wherein the second tube is spaced apart from the first tube; and
        a piston translatable within the second cavity along the central longitudinal axis; and a jack assembly attached to the damper and configured for raising and lowering the body with respect to the wheel, wherein the jack assembly includes:
   a seat abutting and rotatable about the first tube, wherein the seat is translatable with respect to the first tube along the central longitudinal axis;
   wherein the seat is rotatable about the central longitudinal axis in a first direction as the resilient member extends and lengthens along the central longitudinal axis, and is rotatable about the central longitudinal axis in a second direction that is opposite the first direction as the resilient member compresses and shortens along the central longitudinal axis;
   a resilient member coiled about the damper and coupled to the seat so that the resilient member is not rotatable with respect to the seat;
   a ball screw abutting and fixedly attached to the first tube, wherein the ball screw is not rotatable about the first tube and has a first extension and a second extension spaced apart from the first extension along the central longitudinal axis;
   a ball nut abutting and rotatable about the ball screw and the first tube, wherein the ball nut includes;
     a helical portion having a third extension abuttable with the first extension to thereby restrict rotation of the ball nut with respect to the ball screw in the second direction; and
     a casing portion mated to the helical portion and having a fourth extension abuttable with the second extension to thereby restrict rotation of the ball nut with respect to the ball screw in the first direction;
   a first clutch coiled about the ball nut and coupled to the seat, wherein the first clutch is disposed between the first end and the ball screw along the central longitudinal axis; and
   a second clutch coiled about the first tube and coupled to the ball nut, wherein the second clutch is disposed between the first clutch and the second end along the central longitudinal axis;
   wherein the seat is translatable along the first tube to thereby raise and lower the body of the vehicle as the resilient member alternately elongates and compresses along the central longitudinal axis.

13. The suspension system of claim 12, wherein the jack assembly further includes a first solenoid configured for engaging the first clutch and a second solenoid configured for engaging the second clutch, wherein each of the first solenoid and the second solenoid is transitionable between an energized state and a de-energized state.

14. The suspension system of claim 13, wherein the first solenoid and the second solenoid are disposed in the de-energized state so that the first clutch abuts the ball nut to thereby raise the body of the vehicle with respect to the wheel.

15. The suspension system of claim 13, wherein the first solenoid and the second solenoid are disposed in the de-energized state so that the second clutch abuts the first tube to thereby raise the body of the vehicle with respect to the wheel.

16. A vehicle including:
  a body;
  a wheel configured for translating the body across a surface; and
  a suspension system interconnecting the body and the wheel and including:
    a damper interconnecting the body and the wheel and having a central longitudinal axis; and
    a jack assembly attached to the damper and configured for raising and lowering the body with respect to the wheel, wherein the jack assembly includes:
      a seat abutting and rotatable about the damper;
      a resilient member coiled about the damper and coupled to the seat so that the resilient member is not rotatable with respect to the seat;
      a ball screw abutting and fixedly attached to the damper, wherein the ball screw is not rotatable about the damper;
      a ball nut abutting and rotatable about the ball screw and the damper;
      a first clutch coiled about the ball nut and coupled to the seat; and
      a second clutch coiled about the first tube and coupled to the ball nut;
      wherein the seat is translatable along the damper to thereby raise and lower the body of the vehicle.

17. The vehicle of claim 16, wherein the damper includes a first end attached to the body and a second end spaced apart from the first end and attached to the wheel, and further wherein the suspension system further includes a mount disposed between and attached to the body and the first end, and a steering component attached to the wheel and the second end.

18. The suspension system of claim 1, wherein the damper includes:
  a first end attached to the body;
  a second end spaced apart from the first end and attached to the wheel;
  a first tube defining a first cavity therein;
  a second tube disposed within the first cavity and defining a second cavity therein, wherein the second tube is spaced apart from the first tube; and
  a piston translatable within the second cavity along the central longitudinal axis.

19. The vehicle of claim 16, wherein the damper includes:
  a first tube defining a first cavity therein;
  a second tube disposed within the first cavity and defining a second cavity therein, wherein the second tube is spaced apart from the first tube; and
  a piston translatable within the second cavity along the central longitudinal axis.

20. The vehicle of claim 16, wherein the seat is rotatable about the central longitudinal axis in a first direction as the resilient member extends and lengthens along the central longitudinal axis, and is rotatable about the central longitudinal axis in a second direction that is opposite the first direction as the resilient member compresses and shortens along the central longitudinal axis.

\* \* \* \* \*